Oct. 20, 1931.  F. H. WATSON  1,828,581
COTTON PICKER HEAD
Filed Jan. 15, 1930  2 Sheets-Sheet 1
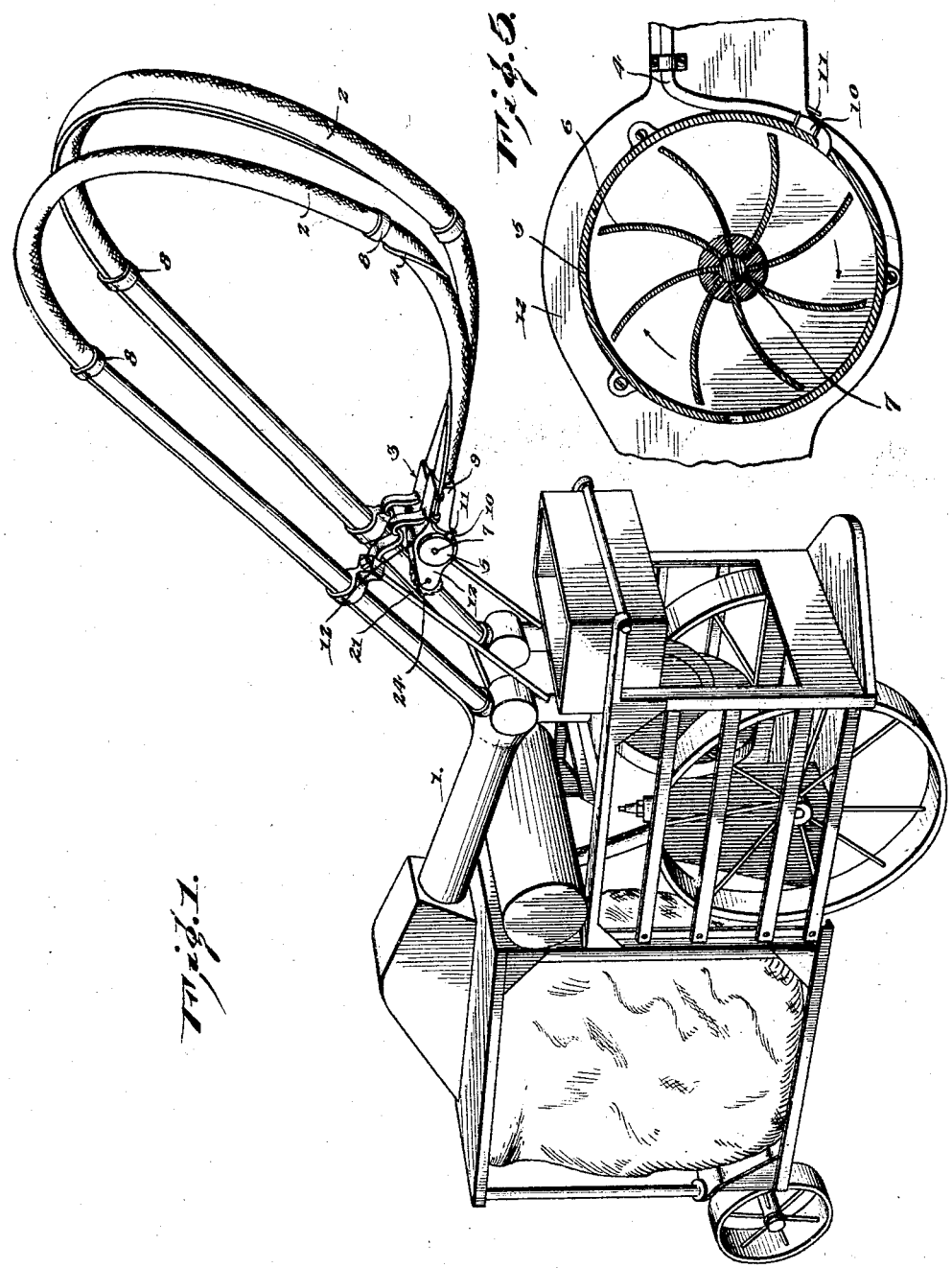
INVENTOR
F. H. Watson,
BY
ATTORNEY
WITNESSES

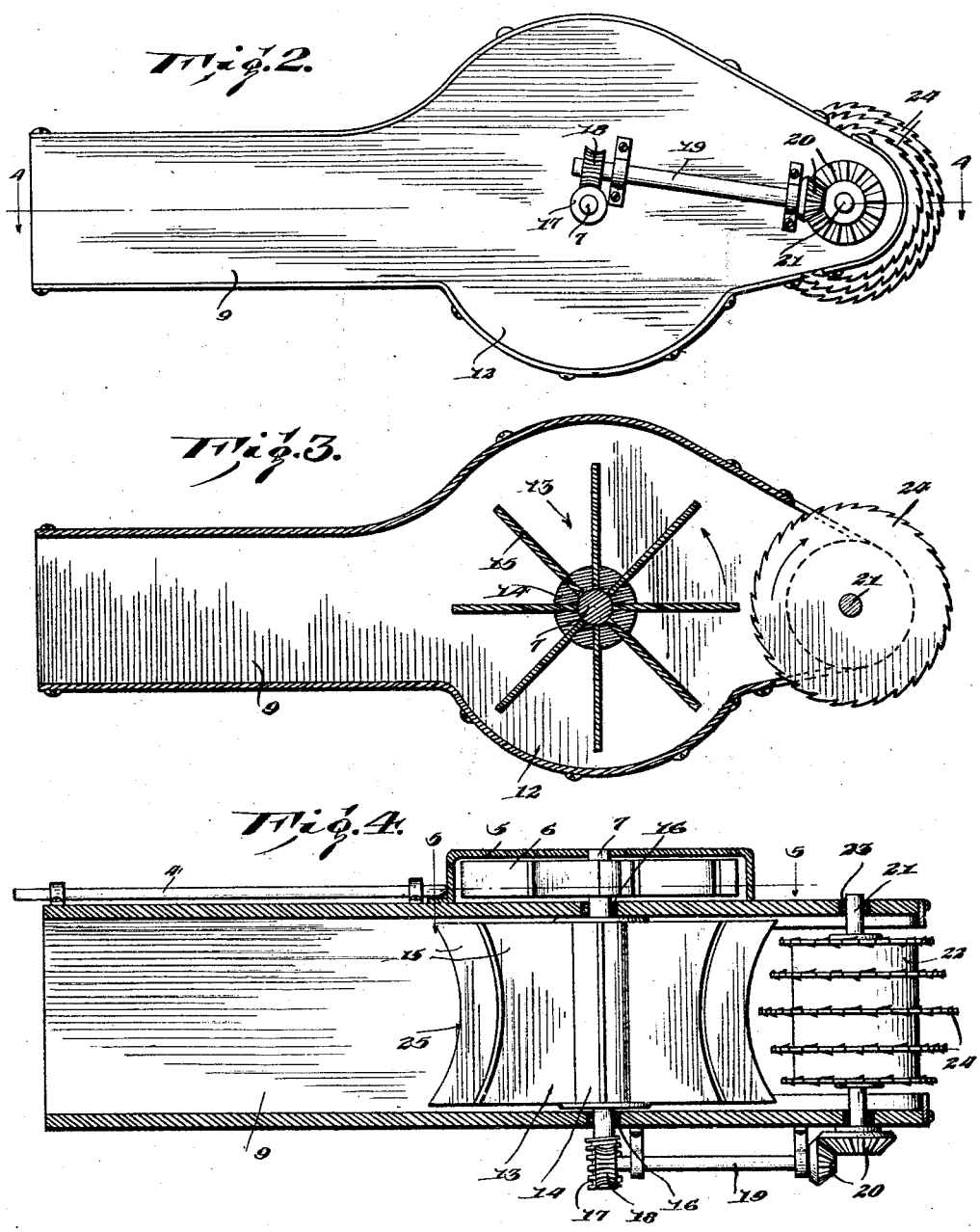

Patented Oct. 20, 1931

1,828,581

UNITED STATES PATENT OFFICE

FRANK H. WATSON, OF JONESBORO, ARKANSAS

COTTON PICKER HEAD

Application filed January 15, 1930. Serial No. 420,963.

This invention relates to improvements in cotton harvesting machinery, more especially in picking heads, and it consists of the constructions, combinations and arrangements herein described and claimed.

One of the outstanding objects of the invention is to provide a cotton picker head in which the active element comprises a battery of circular saws, these being of different sizes so that the battery is made to assume a substantially over or barrel-shape for several important purposes, the chief one of which being to reach down into the burrs for the abstraction of all of the cotton and to insure the abstraction of the cotton by presentation of the picker head in practically any position.

Another object of the invention and one depending directly on the foregoing barrel-shaped battery of saws, is to enable sharpening and setting the teeth without removing the blades from the picker head, this facility being made possible by the stepped disposition of the blades.

A further object of the invention is to provide a lint and seed remover constituting a cleaner for the saw blades, this being composed of a rapidly revoluble hub in which thin steel blades are set.

A still further object of the invention is to provide a cotton picker head which is so light that one may be wielded by each hand of the operator, the attribute of lightness being the direct result of the utmost simplicity of construction.

Other objects and advantages will appear in the following specification, reference being had to the accompanying drawings in which Figure 1 is a perspective view of a known cotton picking machine illustrating the use of an improved picker head in connection with each hose.

Figure 2 is a side elevation of the cotton picker head.

Figure 3 is a vertical longitudinal section.

Figure 4 is a horizontal section taken on the line 4—4 of Figure 2.

Figure 5 is a detail section taken on the line 5—5 of Figure 4, particularly illustrating the turbine by which the cleaner and battery of saws are driven.

Brief reference is made to Figure 1 which illustrate a known type of cotton picking machine 1. This is adapted to be wheeled over the field as the cotton picking progresses. The machine is equipped with a pair of hose 2 each of which terminates at the free end in a picker head 3 that constitutes the subject of this application.

A rubber or other flexible tube 4 leads from the storage tank of an air compressor (neither shown) carried by the machine 1, to a casing 5 (Figs. 4 and 5) of a turbine wheel 6 against the blades of which the air stream is directed to cause revolution of a shaft 7 at a high rate of speed. The tube 4 (the insuing description being confined to one of the picking devices) is suitably attached at 8 to the hose 2 so that the hose and tube will readily flex as one and thus offer no impediment to the motions of the operator.

To the latter end the tube 4 may in practice be wrapped around the hose 2 a number of times at a point near the hand hold 9 which is actually the neck of the picker head 3. The tube will thus not interfere with the free bending of the hose 2 and will not become entangled with cotton stalks.

A valve 10 is connected in the tube 4 at a point adjacent to the turbine casing 5. This valve has a button 11 (Figs. 1 and 5) which by preference is pushed outwardly by a spring (not shown) to close the valve.

The operator in wielding the picker head 3 will push the button 11 whenever he desires the device to operate, and the device can be started and stopped at will with the utmost freedom since the button 11 will be located directly under the hand that grips the neck 9.

An enlargement 12, merging into the neck 9, houses a cleaner 13, the hub 14 of which (Figs. 3 and 4) is fixed on the shaft 7 that extends from side to side of the device (Fig. 4) and protrudes from the side opposite to the turbine casing 5.

The cleaner comprises the hub 14, mentioned already, and a plurality of different steel blades 15 the bases of which are suitably set in the hub 14. At this point it should be explained that the hub 14 might be part of a length of cylindrical stock from which the reduced shaft ends are turned. The cleaner is readily placed in position inside of the picker head 3 because in practice certain necessary parts of the picker head 3 will be made separate so that the assemblage of the various components is readily accomplished.

Ball bearings 16 support the shaft 7 in the sides of the picker head 3. The foregoing protruding end of the shaft carries a worm 17 that meshes with a gear 18 on a countershaft 19 that is suitably supported on the near side of the picker head. This shaft has a driving connection 20 with the shaft 21 of a saw drum 22, the shaft 21 being journaled upon ball bearings 23 in a manner similar to the shaft 7.

That part which is designated the drum 22 in Fig. 4 actually comprises a plurality of discs so assembled upon the shaft 21 in alternation with the serrated discs or saw blades 24 that the latter are spaced from each other. The discs which are herein designated saw blades may merely comprise discs with serrations, or in any event tearing plates the central one of which is largest. The manner in which the blades are held by the shaft 21 and the means by which they are spaced are immaterial. The improvement respecting the saw blades is their stepped arrangement which is produced by making the various blades at each side of the center blade different in diameter.

Figures 2 and 4 clearly indicate the different sizes of saw blades 24. As clearly shown in Figure 4, the teeth of the saw blades are set, this being for the purpose of imparting a greater gathering capacity to the picker element. The largest saw blade is located in the center. The smallest blades are situated on the outside or near the extremities of the drum 22. The blade or blades of intermediate sizes are situated between the largest and smallest blades. This arrangement of blades gives the battery a profile of substantially barrel or oval shape when viewed as in Fig. 4.

There is a distinct purpose and advantage in this arrangement. An open cotton pod has the appearance of a cup shape. In order that an adequate contact may be made with the lint it is necessary for the saws to get down into the open boll. This is best accomplished by the novel form of the battery of saws, the foregoing barrel or oval shape which the picking surfaces assume enabling the operator to reach down and fully engage the fibre when necessary. It is thus possible to fully abstract all of the lint with the least amount of the surrounding dried parts of the pod.

By having the blades at each side of the center blade of progressively smaller diameters it follows that the successive circular rows of teeth will stand out in reference to each other (Fig. 2) so that full access to the fibre may be had by all parts of the saw battery regardless of the position in which the picker head 3 may be presented. Sometimes the operator may turn the picker head considerably to one side in attempting to reach a boll somewhere on the nether part of a plant. In such an instance the saw battery will work to the utmost perfection fundamentally by reason of the barrel or oval peripheral shape of the battery.

A still further advantage of the stepped arrangement of the saw blades (Fig. 2) is that the various teeth stand out in independent circular rows. This makes it possible to file the teeth when sharpening without the necessity of removing the blades from the picker head. The teeth are also given a noticeable set, the staggering of the teeth indicated in Fig. 4 making a most effective contact with the lint. The stepping of the saws makes it possible to apply a hand set with an ease equal to that by which the foregoing filing is accomplished.

It can be understood that when the filing and setting operations can be accomplished without going to the necessity of taking the picker head apart and separating the various blades 24 from the drum 22 there will not only be a marked saving in the time required for each operation but also there will be a total avoidance of the disruption or injury that might be inflicted at the hands of an inexperienced mechanic.

The free ends of the cleaner blades 15 are made concave at 25 (Fig. 4) to suit the contour of the saw blade battery 24. There is an appreciable space between the peripheries of the saw and cleaner blades so that there will be no likelihood of seeds wedging therebetween.

The cleaner 13 also combines the function of a blower. It aids the strong draft of air set up in the picker head and hose 2 by a suction fan on machine (Fig. 1) for the conveyance of the lint and seed to a suitable receptacle on the machine 1. It is of course a matter of common knowledge that the seeds constitute the greater part of the weight of a mass of cotton, the weight of the seeds being approximately two-thirds that of the whole mass. Thus the cleaner 13 is designed with a view to acting upon the seeds as much as on the cotton lint.

Since the seeds naturally carry the lint with them it is a requisite to make the cleaner 13 of such a sturdy construction that it will not wear out under the rather severe service that it is called upon to render. Tufts of cotton as abstracted from the pod often contain eight or ten seeds and are drawn over the saws in a stringy ropy condition. The seeds will be interwoven with this fibre and were it not for the vigorous action that the steel blades 15 are capable of performing at the detaching point there would be the possibility of the stringy cotton winding around upon the drum.

It is thus the function of the blades 15 to detach every seed from the remainder of the cotton tufts the instant that the seeds reach the cleaner blades. Since the cleaner is driven at a speed ranging from 3000 to 5000 R. P. M. it follows that the saws 24 will be absolutely clean after passing the blades 15 and until they again engage the cotton bolls.

Detachment of the seeds from the saws 24 is also aided by the unavoidable centrifugal action which they are subjected to in revolving around with the saws. The cleaner blades 15 strike the seeds thus partially separated and throw them into the air current over the blades 15, which current carries them through the hose 2, to a bag on machine 1.

The operation is readily understood. The picker head 3 is grasped by the operator who uses the neck 9 as a hand hold. The hose 2 (Fig. 1) is flexible, hence the operator is enabled to present the battery of saws 24 above, below, sidewise, or in fact in any desired way to the cotton bolls on the plant.

The drum 24 revolves only when the operator presses on the button 11. Doing this opens the valve 10 (Fig. 4) so that the compressed air from a suitable source is discharged against the blades of the turbine wheel 6 (Fig. 5). Since this wheel is carried by the shaft 7 in common with the cleaner 13 (Fig. 4) and the battery of saws 24 is driven from the shaft 7 it follows that all of these parts are instantly set in motion when the button 11 is pressed.

It has been pointed out already that the barrel or oval shape of the battery of saws 24 is of utmost importance in the effective working of the picker head. This particular shape makes it possible to produce an effective abstraction of the lint in practically any position of the picker head.

Next in importance is the particular character of the cleaner 13. The sturdy blades 15 are especially adapted to dislodge seeds from the saws 24. Since the cotton lint clings to the seeds it follows that the lint will be removed so effectively that the saws will come out in an absolutely clean condition.

While the construction and operation of the improved cotton picker head is that of a generally preferred form, obviously modifications and changes may be made without departing from the spirit of the invention or the scope of the claims.

I claim:—

1. In a picker head, an active picking element being of an oval barrel-shape and having serrations.

2. In a picker head, an active element comprising a plurality of revoluble coaxial tearing plates of which the central one is largest and the lateral ones are smaller.

2. In a picker head, an active element comprising a plurality of coaxial serrated discs of which the central one is of the greatest diameter and the lateral ones are of progressively smaller diameters producing a profile of substantial barrel-shape.

4. In a picker head, an active element comprising a plurality of coaxial circular saws of which the central one is largest and the lateral ones progressively smaller.

5. In a picker head, an active element comprising a plurality of coaxial circular saws, and means by which the saws are spaced apart, said saws being of progressively smaller diameters reading from the central and largest saw, thus locating the teeth in independent circular zones and presenting a stepped arrangement enabling sharpening and setting of the teeth without dismantling the active element.

6. In a picker head, an active element comprising a plurality of coaxial saws of various diameters producing a profile of substantial barrel-shape, and a revoluble cleaner to co-act with said element having blades with concave free ends conforming in shape to one side of said element.

7. In a picker head, an active element comprising a plurality of coaxial saws of different diameters presenting a profile of substantial barrel-shape, and a revoluble cleaner co-acting with said element having rigid steel blades with concave free ends adapted to confront said element.

8. A picker head comprising a neck providing a hand hold, an enlargement into which the neck merges having an opening, an active element journaled upon the head in said opening comprising a battery of coaxial spaced saw blades of various diameters presenting a profile of substantial barrel-shape, a cleaner journaled in the enlargement having blades with concave ends conforming in shape to one side of said element, means for driving the element, and means by which the motion of the cleaner is imparted to said element.

9. In a picker head, coacting picker and cleaner elements, a turbine mounted in common with the cleaner element, means to direct high pressure fluid against the turbine thus to drive the cleaner element at a high rate of speed, and reducing drive means between the elements for driving the picker at a comparatively low speed.

10. In a picker head, an active element comprising a plurality of coaxial saws of various diameters producing a profile of substantial barrel-shape, the teeth of said saws being set, and a revoluble cleaner to coact with said element having blades with concave free ends conforming in shape to one side of said element.

FRANK H. WATSON.